United States Patent
Fenile

(10) Patent No.: US 10,301,114 B2
(45) Date of Patent: May 28, 2019

(54) TRANSPORT DEVICE, IN PARTICULAR IN THE FORM OF A SUSPENSION CONVEYOR

(71) Applicant: FERAG AG, Hinwil (CH)

(72) Inventor: Roberto Fenile, Wetzikon (CH)

(73) Assignee: FERAG AG, Hinwil (CH)

(*) Notice: Subject to any disclaimer, the term of this patent is extended or adjusted under 35 U.S.C. 154(b) by 0 days.

(21) Appl. No.: 15/542,893

(22) PCT Filed: Jan. 7, 2016

(86) PCT No.: PCT/EP2016/050158
§ 371 (c)(1),
(2) Date: Jul. 11, 2017

(87) PCT Pub. No.: WO2016/120030
PCT Pub. Date: Aug. 4, 2016

(65) Prior Publication Data
US 2017/0369248 A1    Dec. 28, 2017

(30) Foreign Application Priority Data
Jan. 26, 2015 (CH) .......................................... 89/15

(51) Int. Cl.
*B65G 9/00*    (2006.01)
*B65G 17/20*   (2006.01)
(Continued)

(52) U.S. Cl.
CPC ............. *B65G 17/20* (2013.01); *B65G 9/004* (2013.01); *B65G 19/025* (2013.01); *B65G 47/38* (2013.01);
(Continued)

(58) Field of Classification Search
CPC ...... B65G 9/004; B65G 17/20; B65G 19/025; B65G 47/36; B65G 47/38; B65H 2301/432
(Continued)

(56) References Cited

U.S. PATENT DOCUMENTS 3,338,179 A    8/1967 Klemm
3,533,499 A   10/1970 Harkess
(Continued)

FOREIGN PATENT DOCUMENTS

CH    000089/15    1/2015
DE    12 33 777 B   2/1967
(Continued)

OTHER PUBLICATIONS

Co-pending U.S. Appl. No. 15/542,880, Fenile, R. et al., "Method for Filling the Pockets of a Transport Device in the Form of a Suspension Conveyor and Device for Carrying Out Said Method," filed Jul. 11, 2017.
(Continued)

*Primary Examiner* — Joseph A Dillon, Jr.
(74) *Attorney, Agent, or Firm* — Pauley Erickson & Kottis

(57) ABSTRACT

The invention relates to a transport device (10.1), in particular in the form of a suspension conveyor, said device comprising one or more trolleys (11) which are movably mounted on a trolley track (15) in a trolley track direction and on each of which a device (18, 19) hanging downwards for receiving transported goods is arranged. To achieve a simple construction and operation, the device (18, 19) for receiving transported goods forms at least one flexible material web (18) that is planar when open and that can be fastened at both ends (19) to the trolley (11), forming a carrying loop hanging downwards.

21 Claims, 14 Drawing Sheets

(51) Int. Cl.
*B65G 19/02* (2006.01)
*B65G 47/38* (2006.01)
*B65G 47/61* (2006.01)
*B65G 47/44* (2006.01)

(52) U.S. Cl.
CPC ............ *B65G 47/44* (2013.01); *B65G 47/61* (2013.01); *B65G 2201/0238* (2013.01)

(58) Field of Classification Search
USPC ................ 198/465.1, 465.3, 466.1, 682
See application file for complete search history.

(56) References Cited

U.S. PATENT DOCUMENTS

| | | | | |
|---|---|---|---|---|
| 3,663,052 A * | 5/1972 | Schurch | .............. | B65G 17/485 212/335 |
| 3,782,529 A * | 1/1974 | Buccicone | ......... | B65G 21/2018 198/679 |
| 3,807,314 A * | 4/1974 | Slemmons | ........... | B23Q 7/1426 104/165 |
| 4,051,946 A * | 10/1977 | Buccicone | ......... | B65G 21/2018 198/679 |
| 4,104,156 A | 8/1978 | Fletcher | | |
| 4,114,539 A * | 9/1978 | Deno | ................... | B61B 10/02 104/165 |
| 140,163 A | 2/1979 | Usner | | |
| 4,140,163 A * | 2/1979 | Usner | ...................... | A47F 7/19 206/287 |
| 4,297,959 A * | 11/1981 | Frost | ..................... | B65G 17/20 29/897 |
| 4,718,349 A * | 1/1988 | Wahren | ................. | B65G 19/02 104/165 |
| 4,727,979 A * | 3/1988 | Wolfson | ............... | B65G 19/025 198/803.3 |
| 4,848,538 A * | 7/1989 | Vaida | ...................... | B65G 17/323 198/687.1 |
| 4,878,577 A * | 11/1989 | Romero Lledo | .... | A47G 25/487 198/803.9 |
| 4,922,829 A * | 5/1990 | Kuchta | ................. | B65G 19/025 104/127 |
| 4,925,015 A * | 5/1990 | Vaida | ................... | B65G 19/025 198/678.1 |
| 4,946,023 A * | 8/1990 | Heinold | ................ | B65G 47/61 198/419.1 |
| 5,142,993 A * | 9/1992 | Robu | ..................... | B65G 9/002 104/89 |
| 5,216,949 A | 6/1993 | Bertozzi | | |
| 5,346,052 A * | 9/1994 | Fox | ..................... | A01K 5/0266 198/350 |
| 5,566,623 A * | 10/1996 | Wareham | ............... | B65G 17/20 104/95 |
| 5,697,508 A * | 12/1997 | Rifkin | ................. | A47G 25/0692 206/286 |
| 6,357,574 B1 * | 3/2002 | Eberle | ................ | B65H 29/003 198/465.4 |
| 6,386,356 B1 * | 5/2002 | Eberle | .................... | B65H 29/02 198/687.1 |
| 6,394,449 B1 * | 5/2002 | Reist | .................... | B65H 29/003 198/803.9 |
| 6,398,016 B1 * | 6/2002 | Maeder | .................. | B65H 29/02 198/805 |
| 6,742,648 B2 * | 6/2004 | Honegger | .............. | B65G 19/02 198/687.1 |
| 8,448,774 B2 * | 5/2013 | Huettner | ............. | B65G 47/5131 198/347.1 |
| 8,607,963 B2 * | 12/2013 | Wend | ..................... | B65G 47/61 141/250 |
| 8,672,118 B2 * | 3/2014 | Janzen | ................... | B65G 17/32 198/678.1 |
| 9,108,806 B2 * | 8/2015 | Huettner | ............. | B65G 47/5104 |
| 9,187,252 B2 * | 11/2015 | Wend | ..................... | B65G 17/12 |
| 9,409,730 B2 * | 8/2016 | Andreae | ................. | B66C 19/00 |
| 9,499,345 B2 * | 11/2016 | Fenile | .................. | B65G 19/025 |
| 9,558,472 B1 * | 1/2017 | Tubilla Kuri | ........ | G05B 19/041 |
| 9,630,751 B1 | 4/2017 | Otto | | |
| 9,828,182 B2 | 11/2017 | Schoenenberger | | |
| 9,932,170 B2 * | 4/2018 | Munholland | ........ | B65D 90/004 |
| 10,106,324 B2 * | 10/2018 | Menke | ................... | B65G 43/00 |
| 2004/0089623 A1 * | 5/2004 | Harrell | ................... | B65G 9/002 211/113 |
| 2007/0029164 A1 * | 2/2007 | Bree | ....................... | B62D 65/06 198/347.1 |
| 2012/0037272 A1 * | 2/2012 | Wend | ................... | B65G 19/025 141/250 |
| 2012/0216917 A1 | 8/2012 | Janzen | | |
| 2014/0284179 A1 | 9/2014 | Janzen | | |
| 2014/0284180 A1 * | 9/2014 | Wend | .................... | B65G 17/12 198/713 |
| 2014/0291123 A1 | 10/2014 | Olivieri et al. | | |
| 2015/0139772 A1 * | 5/2015 | Rapp | ..................... | B65B 43/145 414/796.5 |
| 2015/0225177 A1 * | 8/2015 | Schonenberger | ...... | B65G 17/20 198/687.1 |
| 2016/0046446 A1 * | 2/2016 | Matsuoka | .............. | B65G 17/20 198/678.1 |
| 2016/0159558 A1 | 6/2016 | Schneuing | | |
| 2017/0015505 A1 * | 1/2017 | Schoenenberger | .... | B65G 17/20 |
| 2017/0088302 A1 * | 3/2017 | Auf Der Maur | ....... | B65B 43/42 |
| 2018/0086563 A1 * | 3/2018 | Janzen | ................... | B65D 33/02 |

FOREIGN PATENT DOCUMENTS

| | | |
|---|---|---|
| DE | 2 221 318 | 11/1973 |
| DE | 81 33 433 U1 | 3/1982 |
| DE | 38 40 521 A1 | 6/1990 |
| DE | 40 42 375 A1 | 12/1991 |
| DE | 689 07 399 T2 | 10/1993 |
| DE | 692 01 185 T2 | 5/1995 |
| DE | 297 09 547 U1 | 9/1997 |
| DE | 196 14 905 A1 | 11/1997 |
| DE | 103 09 127 A1 | 9/2004 |
| DE | 10 2004 018 569 A1 | 11/2005 |
| DE | 10 2008 026720 A1 | 12/2009 |
| DE | 10 2008 061 685 A1 | 6/2010 |
| DE | 10 2010 033 905 A1 | 2/2012 |
| DE | 10 2010 053 590 A1 | 6/2012 |
| DE | 10 2011 015 138 A1 | 9/2012 |
| DE | 10 2011 101 987 A1 | 11/2012 |
| DE | 10 2012 108 757 A1 | 3/2014 |
| DE | 10 2012 018925 A1 | 3/2014 |
| DE | 10 2013 205 172 A1 | 9/2014 |
| DE | 10 2014 203 298 A1 | 8/2015 |
| EP | 1 420 105 A1 | 5/2004 |
| EP | 1 420 106 A1 | 5/2004 |
| EP | 2 130 968 A1 | 12/2009 |
| EP | 2 196 415 A2 | 6/2010 |
| EP | 2 418 160 A1 | 2/2012 |
| EP | 2 620 394 A1 | 7/2013 |
| EP | 2 708 478 B1 | 3/2014 |
| EP | 2 786 940 A1 | 10/2014 |
| GB | 733 714 A | 7/1955 |
| JP | 3060257 B2 | 7/2000 |
| WO | WO 2012/156451 A1 | 11/2012 |
| WO | WO 2015/124525 A1 | 8/2015 |
| WO | WO 2016/030274 A1 | 3/2016 |
| WO | WO 2016/030275 A1 | 3/2016 |
| WO | WO 2016/120031 A1 | 8/2016 |
| WO | WO 2016/120032 A1 | 8/2016 |

OTHER PUBLICATIONS

Co-pending U.S. Appl. No. 15/542,887, Fenile, R. et al., "Method for Emptying the Pockets of a Transport Device in the Form of a Suspension Conveyor, and Device for Carrying Out Said Method," filed Jul. 11, 2017.

Co-pending U.S. Appl. No. 15/692,605, Fenile, R., "Method for Opening a Transport Pocket Suspended on a. Carriage as Well as a

(56) References Cited

OTHER PUBLICATIONS

Pocket Opening Device for Performing the Method," filed Aug. 31, 2017.

\* cited by examiner

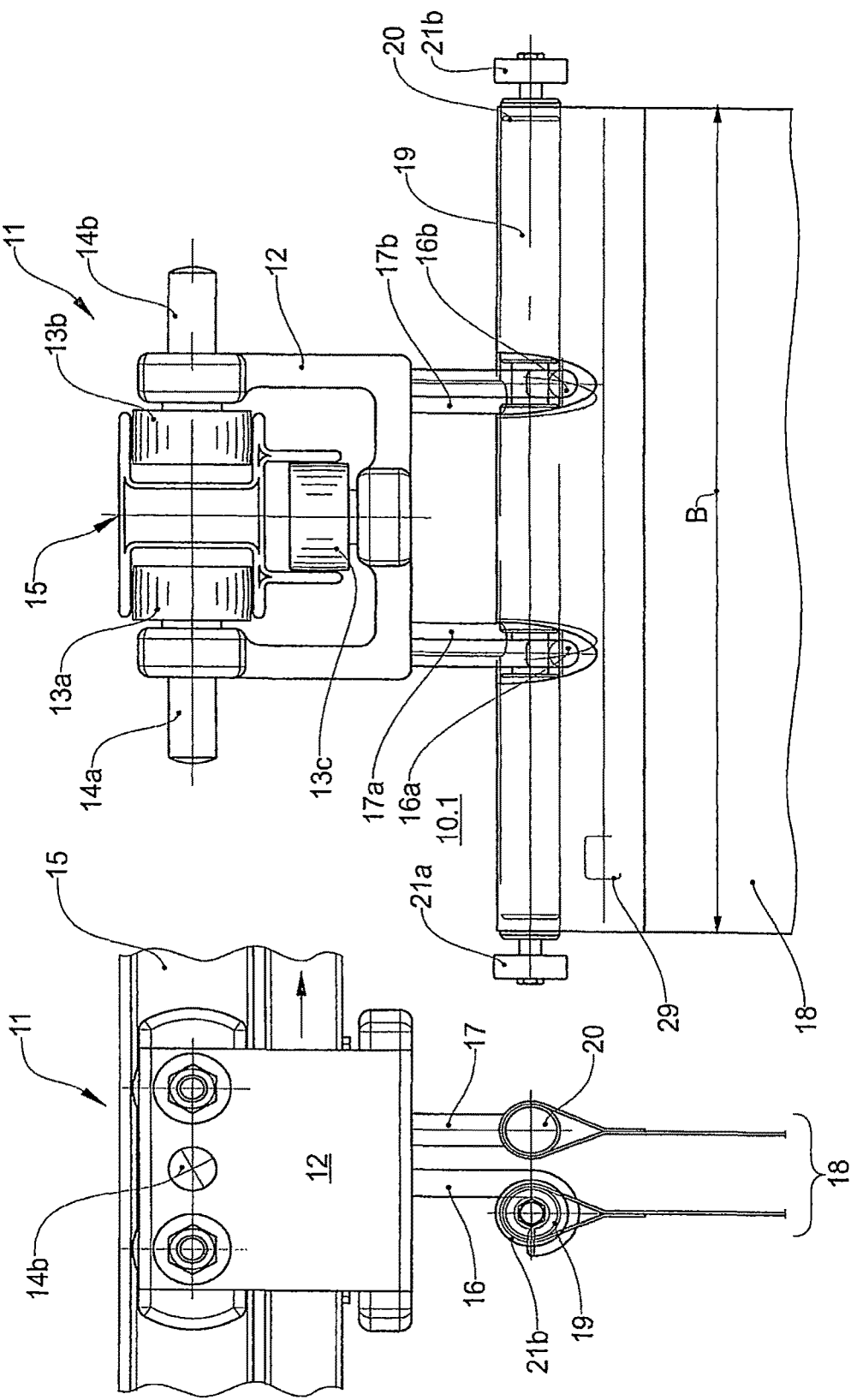

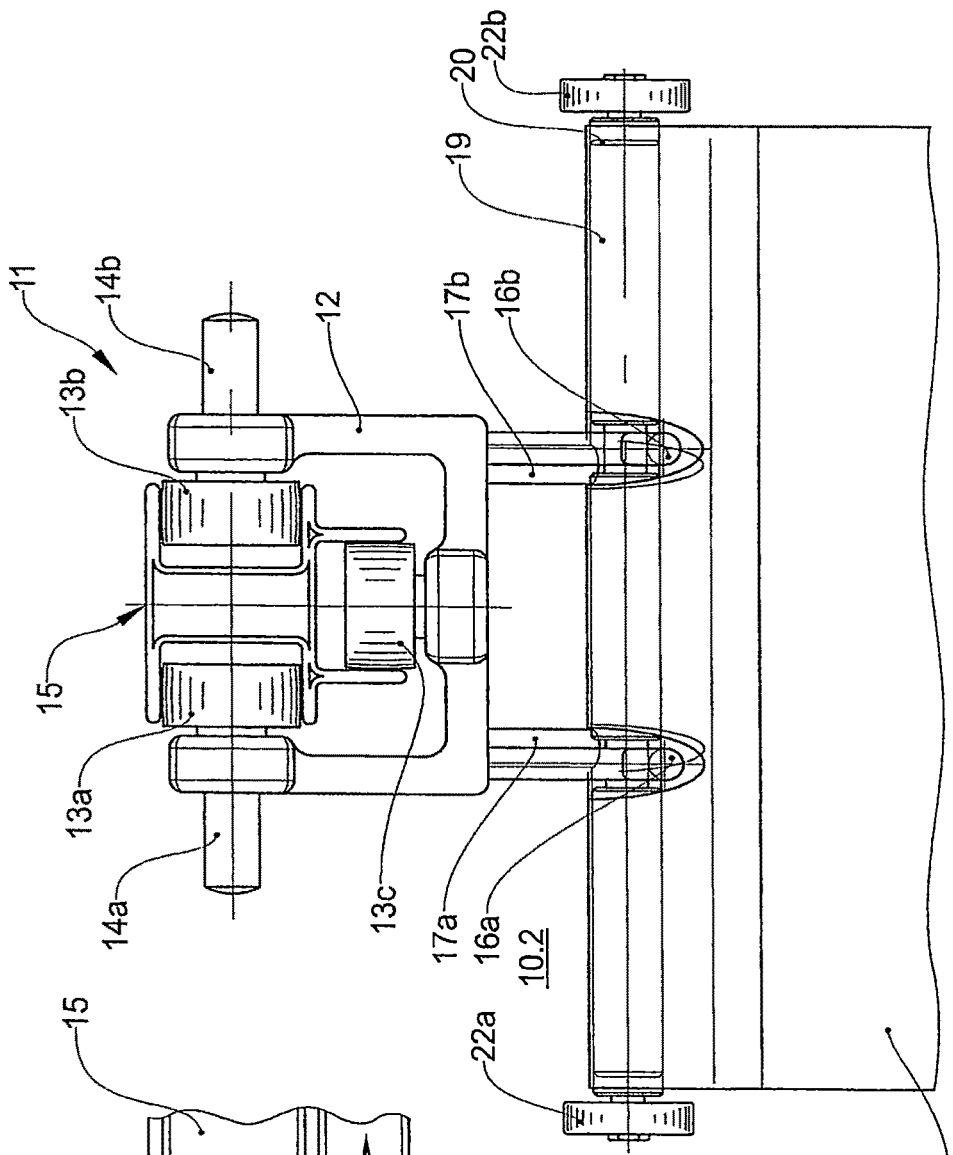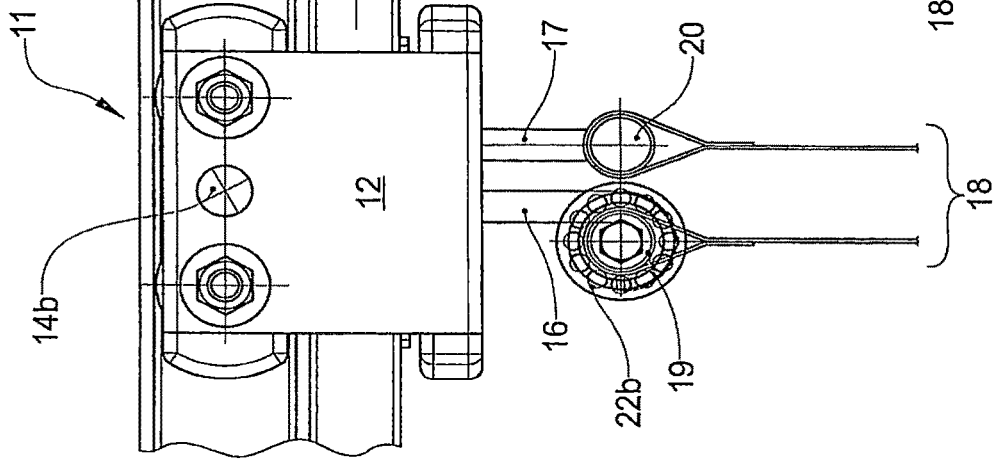

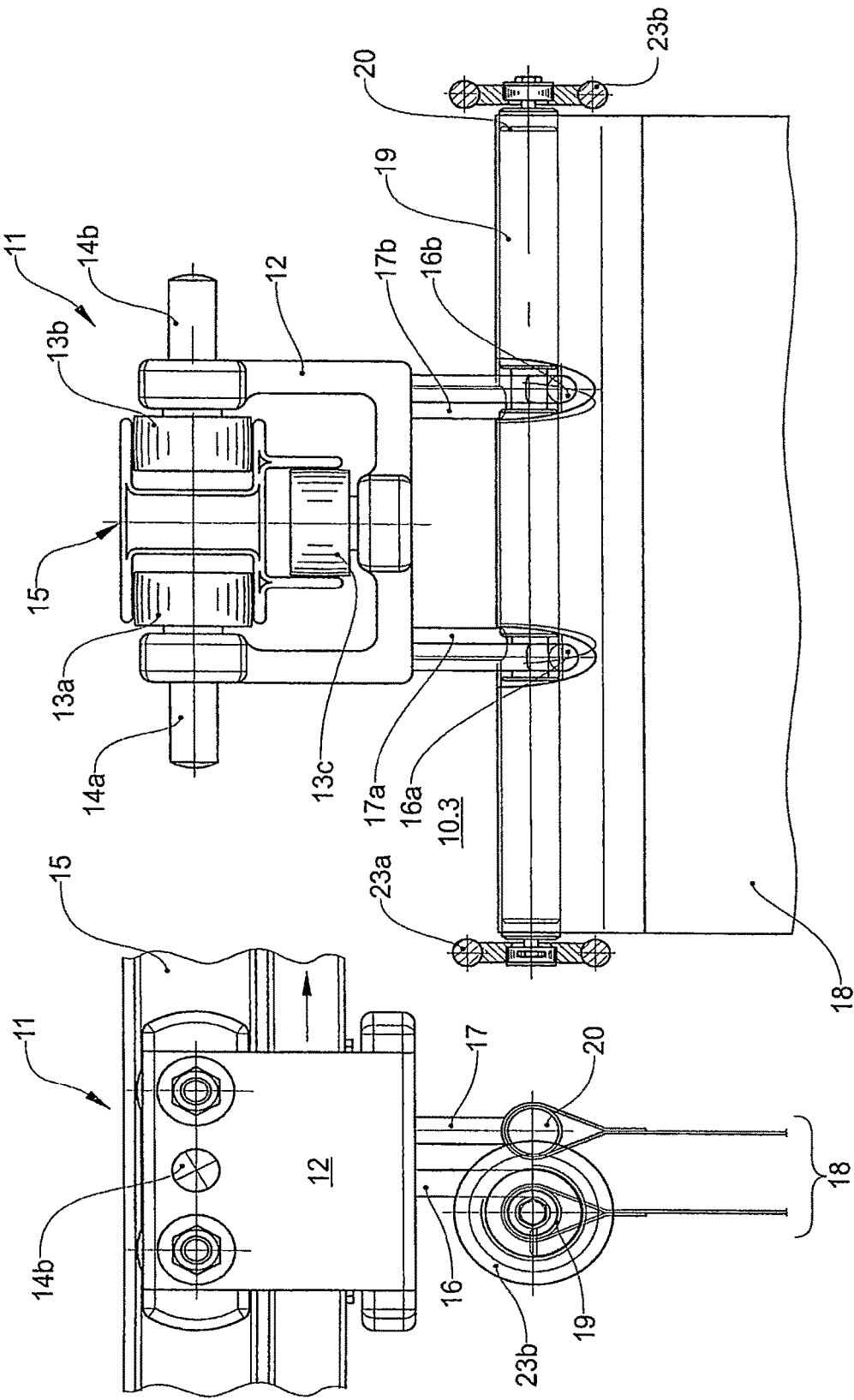

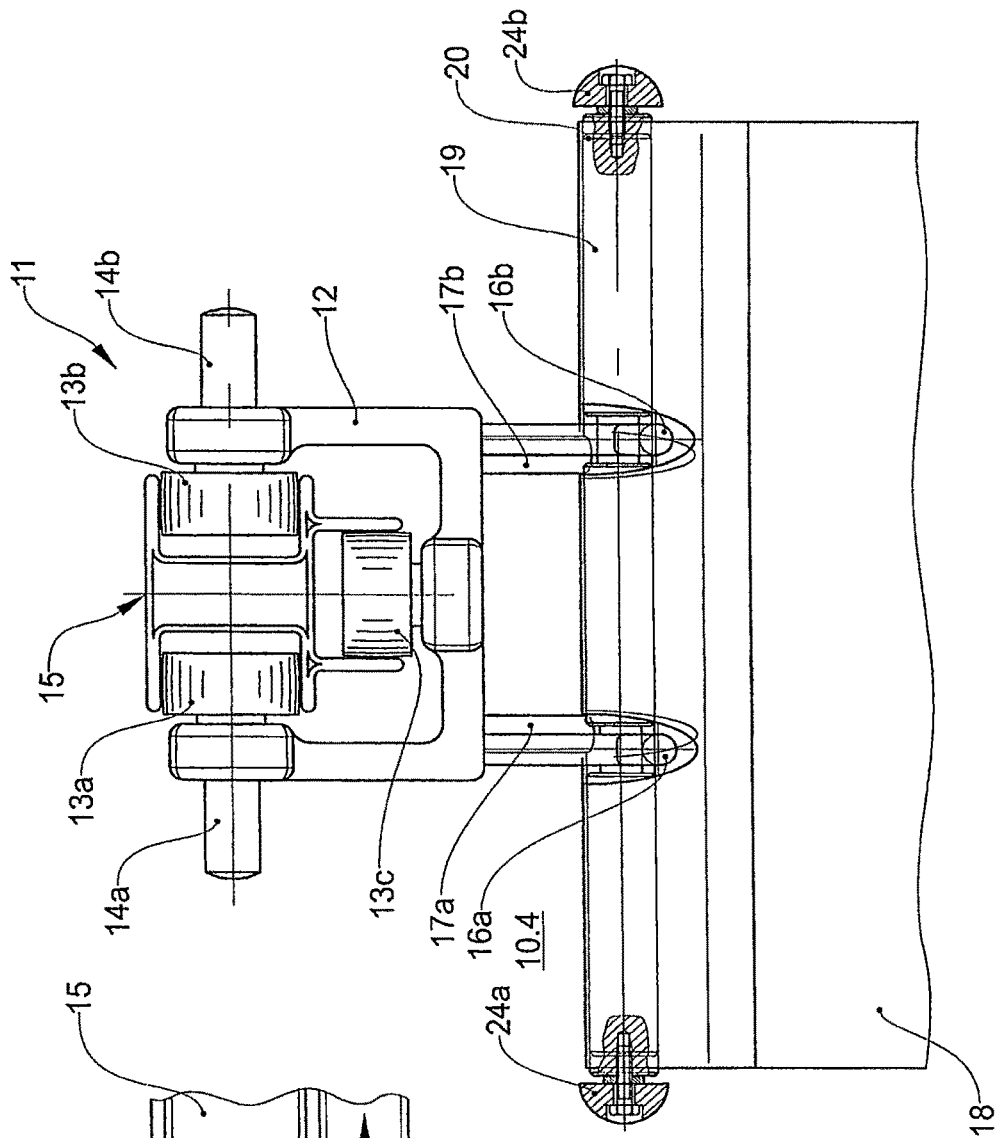

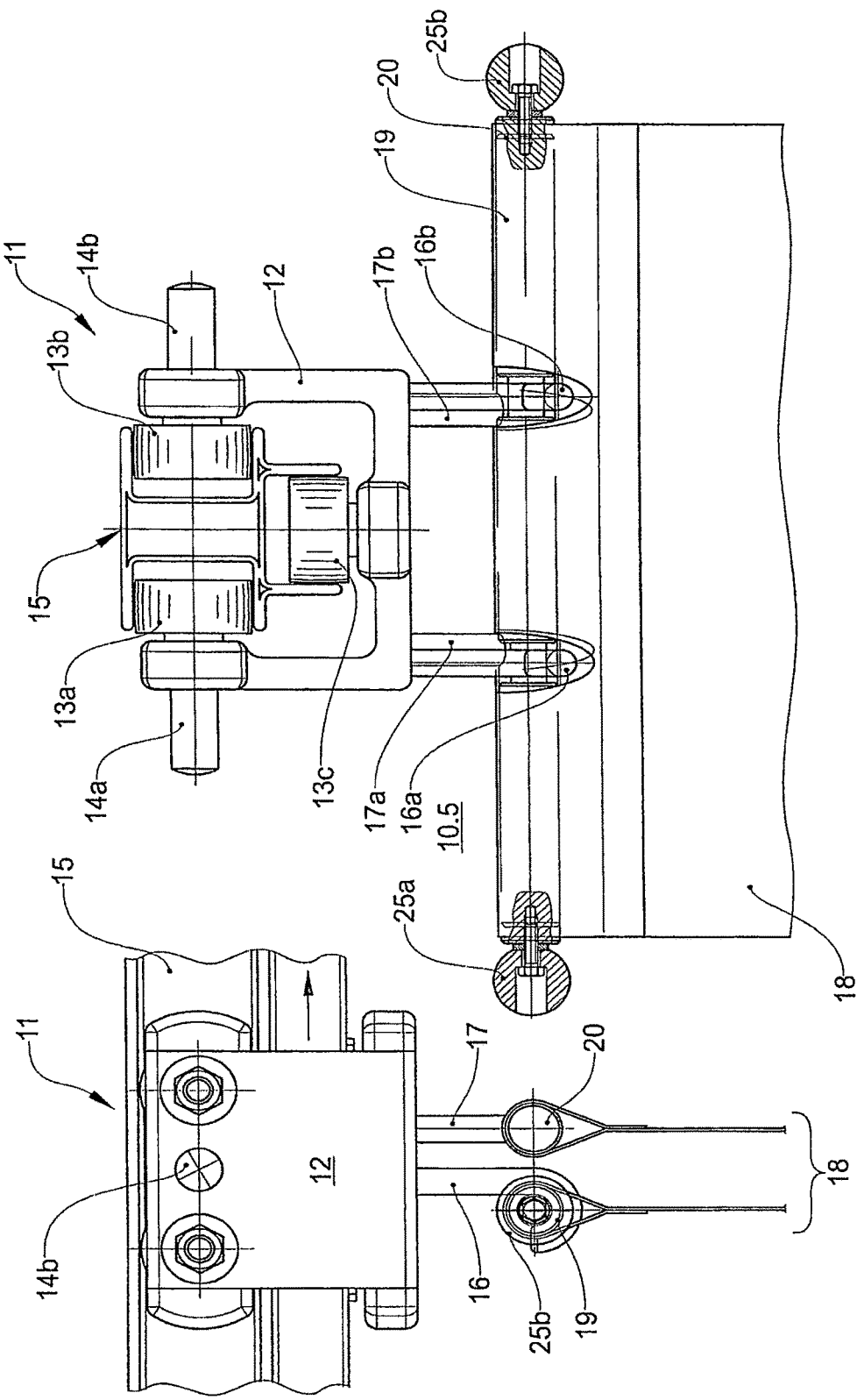

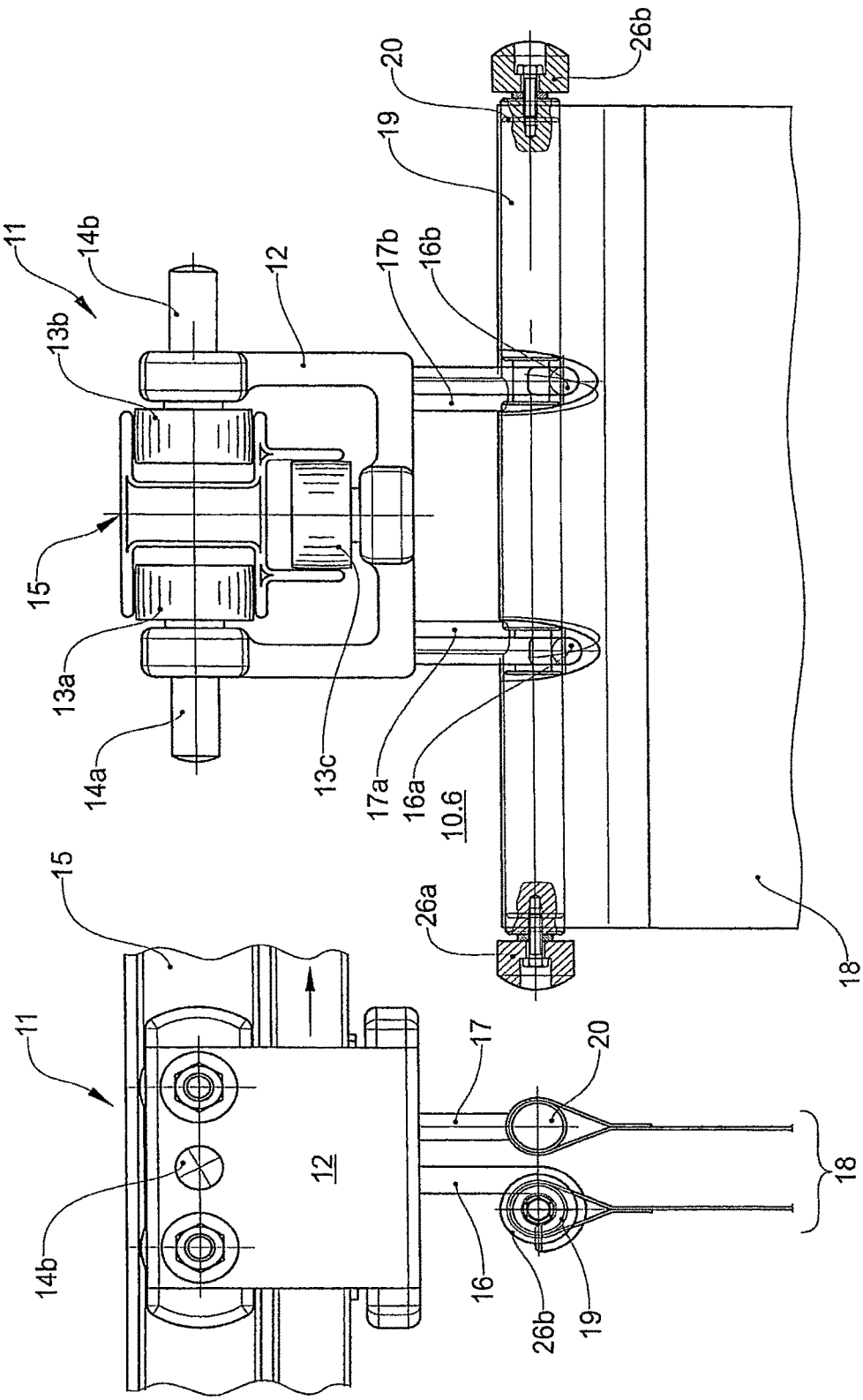

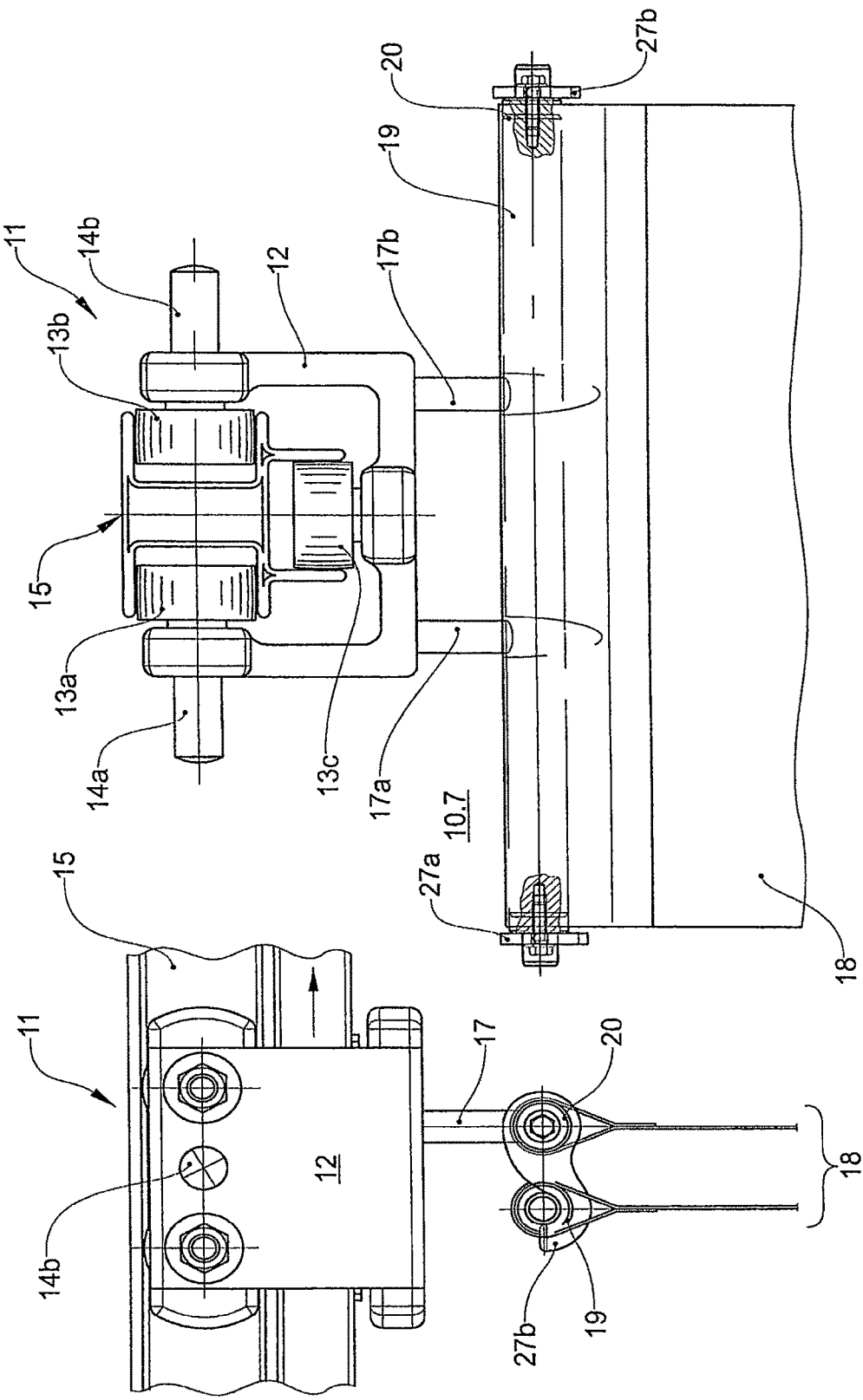

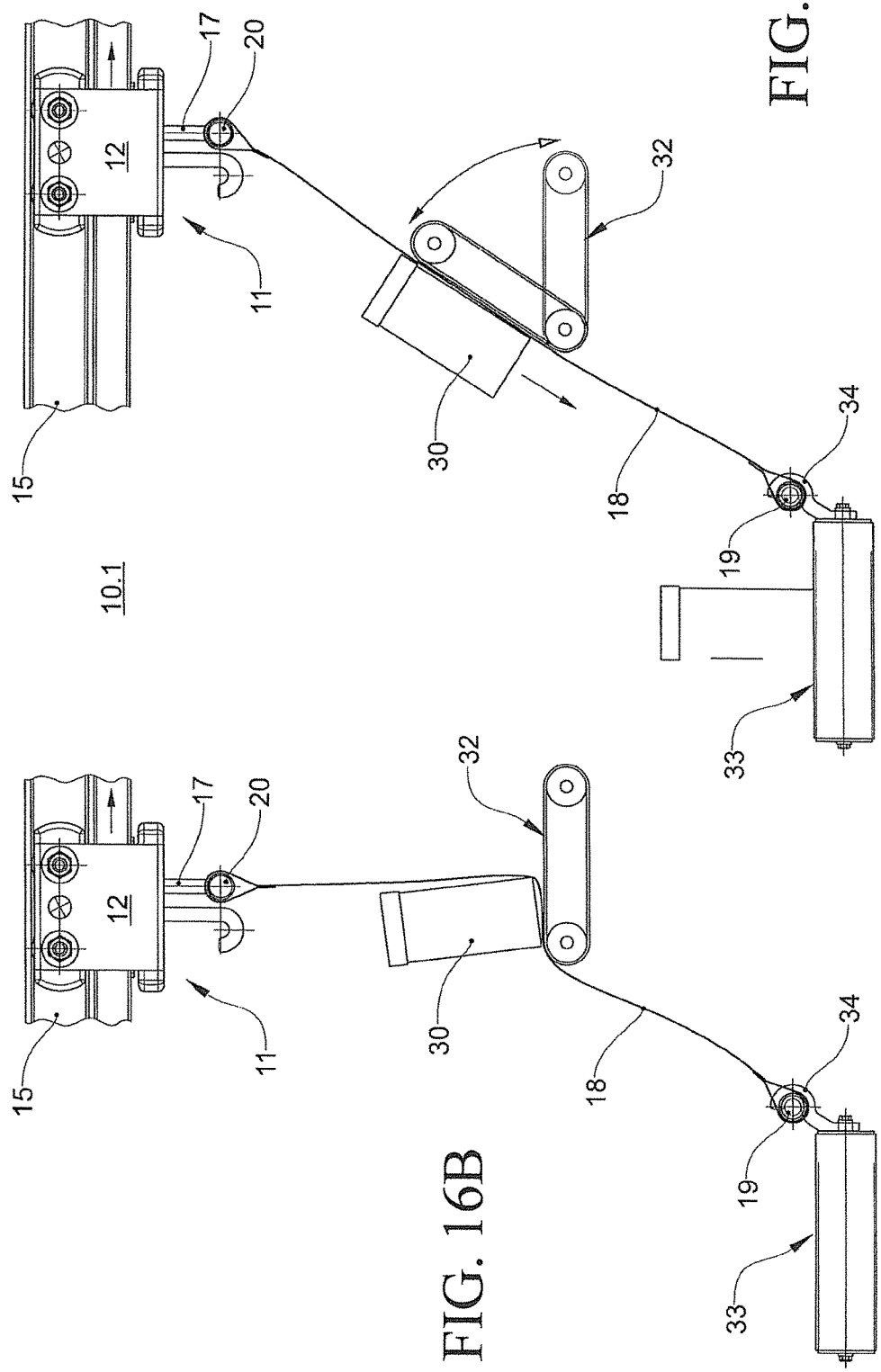

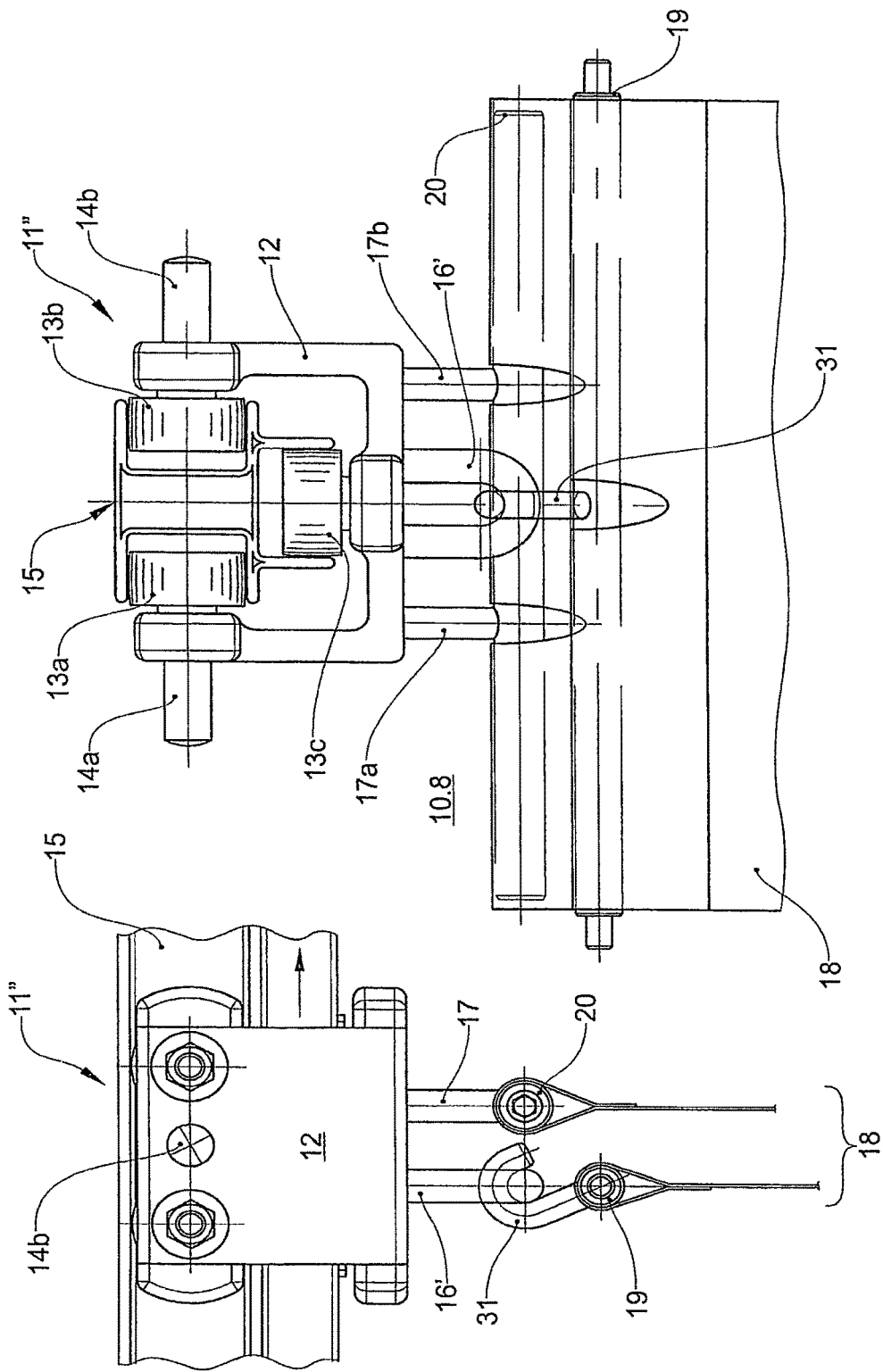

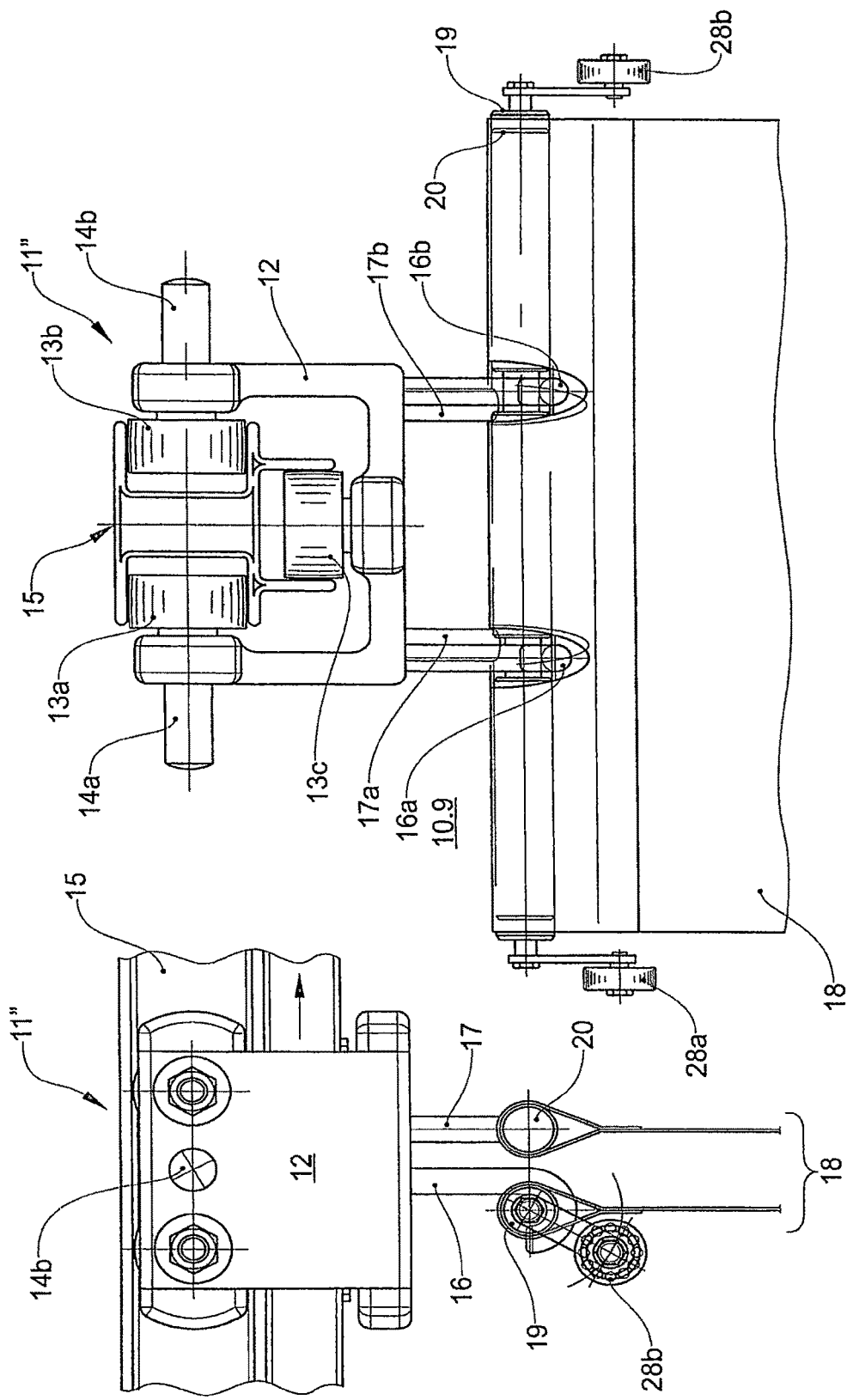

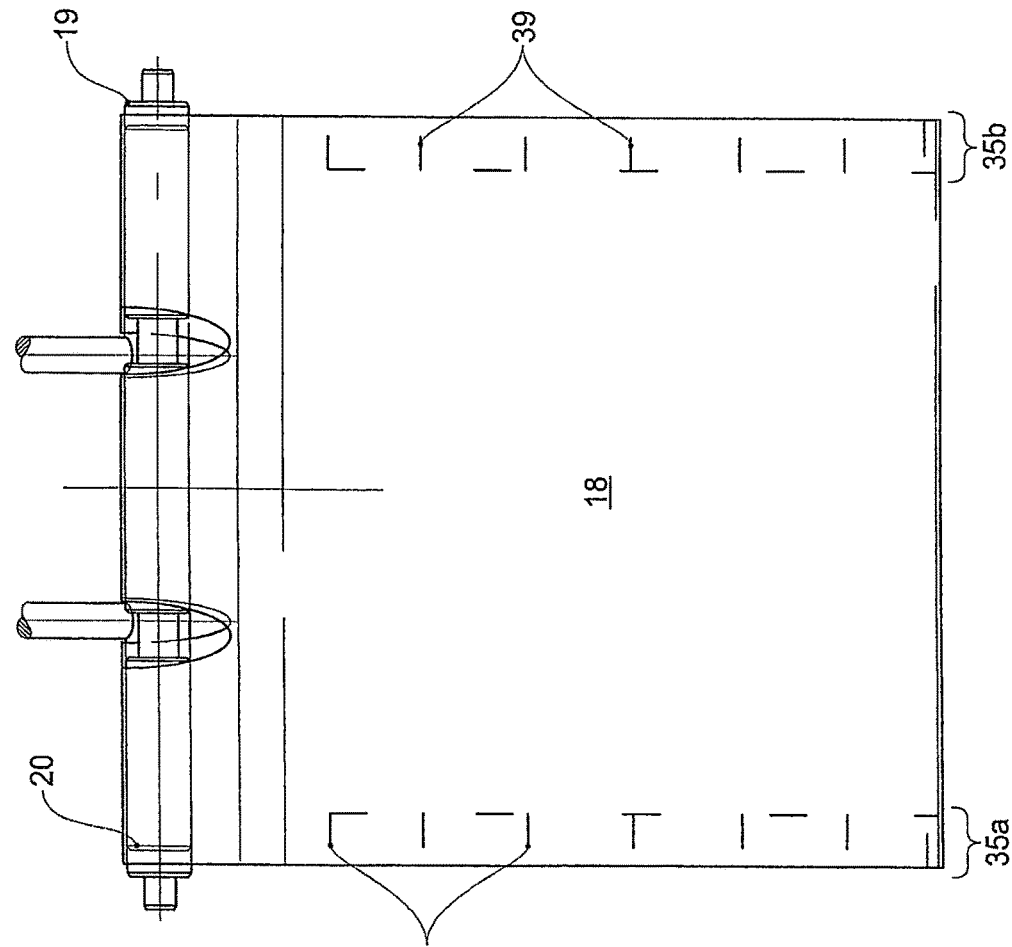
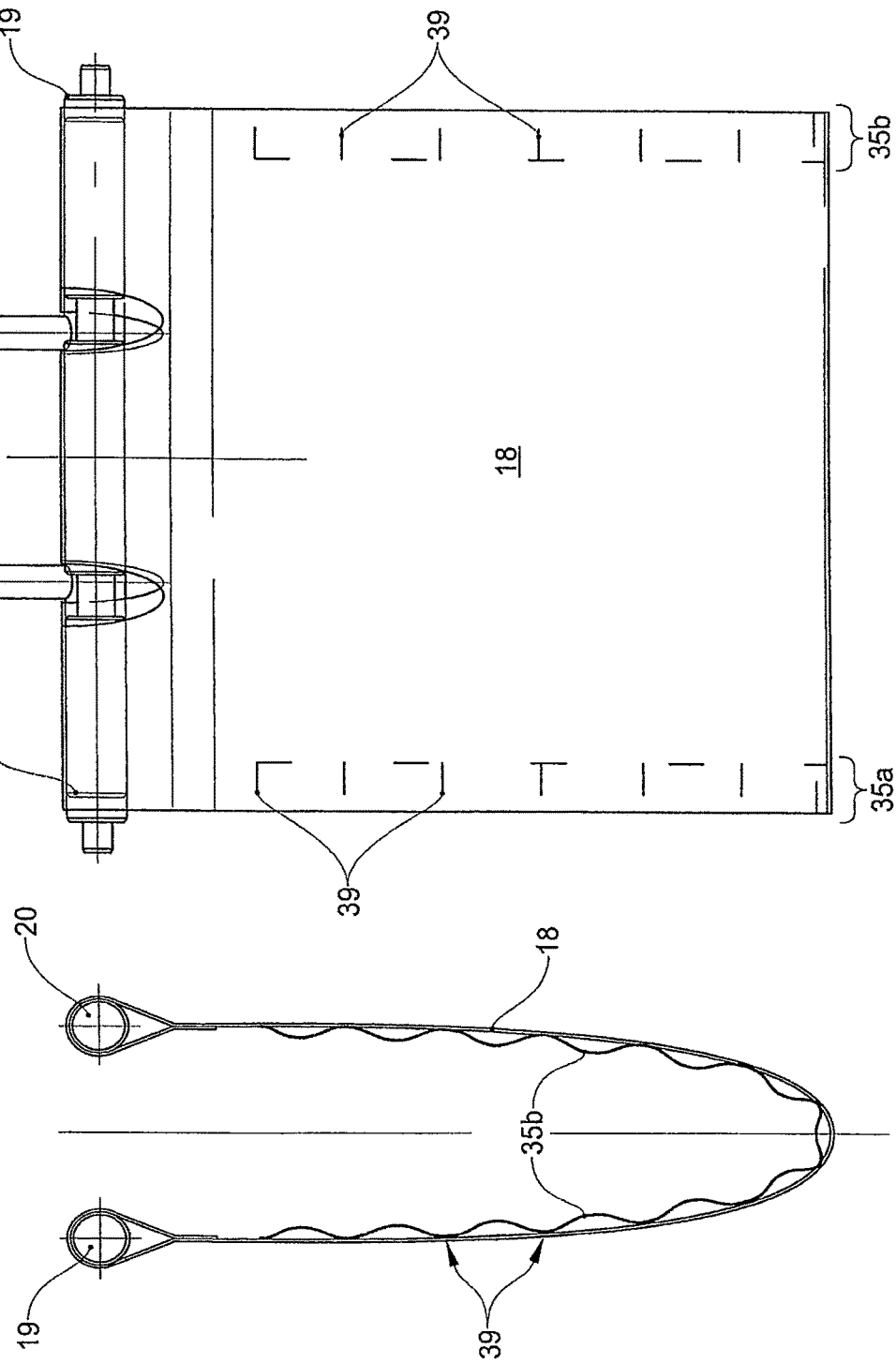

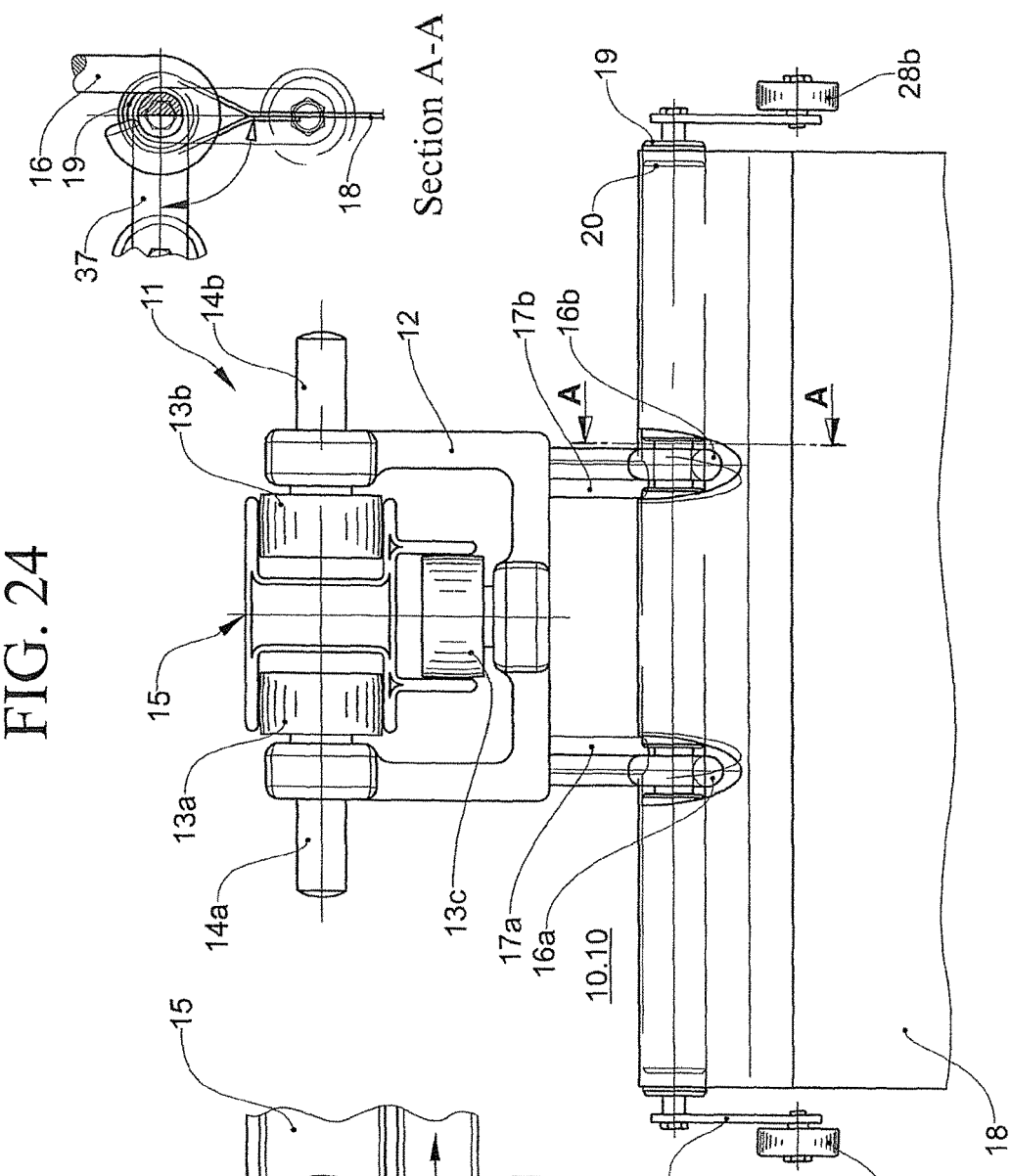
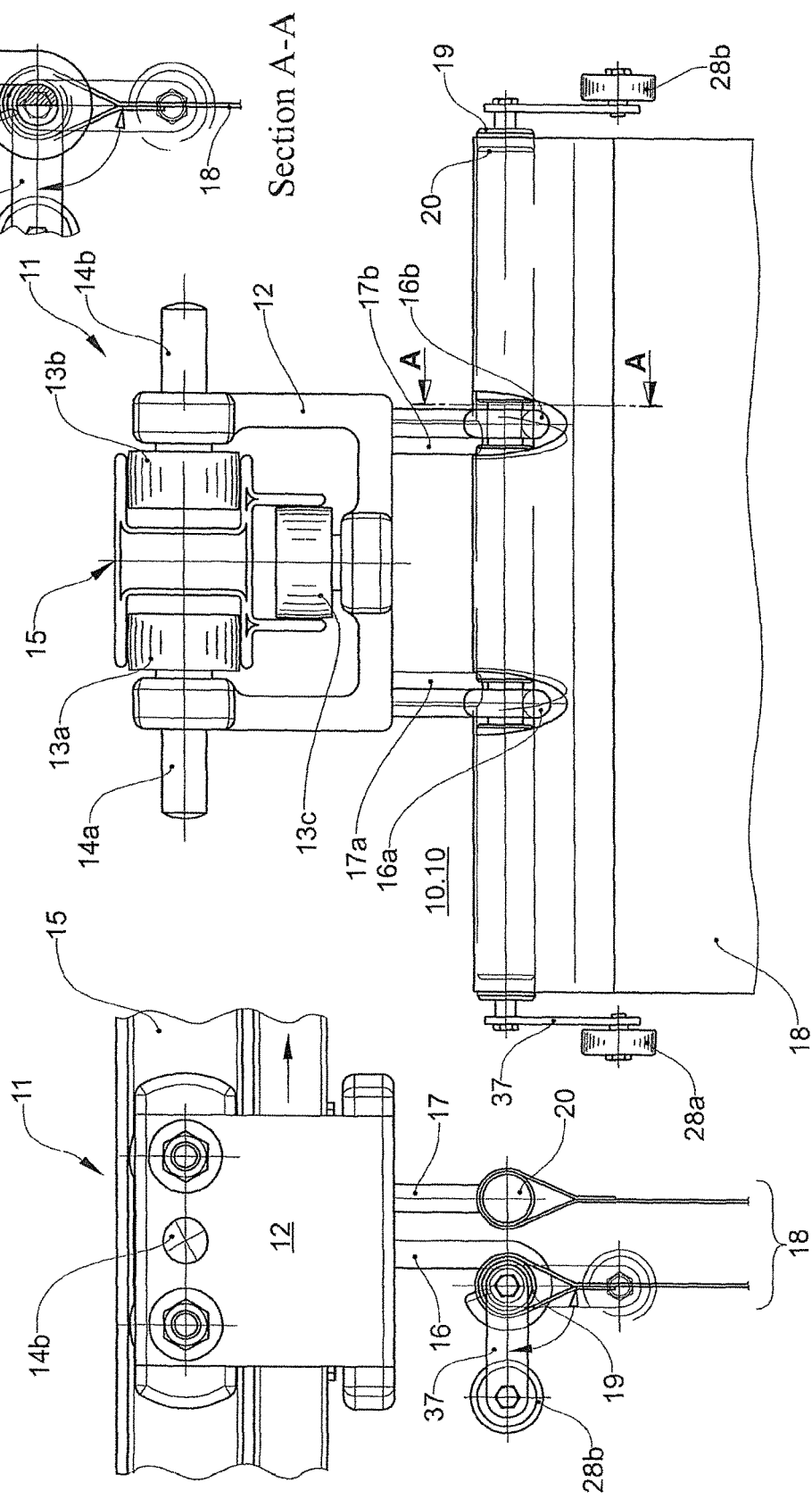
FIG. 23
FIG. 24
Section A-A

TRANSPORT DEVICE, IN PARTICULAR IN THE FORM OF A SUSPENSION CONVEYOR

BACKGROUND OF THE INVENTION

Field of the Invention

The present invention relates to the field of conveyor technology. It relates to a transport device.

Discussion of Related Art

A multiplicity of suspension conveyors are known in the prior art, wherein the conveyed goods to be conveyed are accommodated by transport pockets which are constituted in a comparatively complex manner and are equipped with complex opening and closing mechanisms which, precisely in the case of a larger conveyor installation with many individual pockets, result on the one hand in considerable additional expenditure on the erection of a new installation and on the other hand have an increased susceptibility to malfunction or a complete functional failure in the continuous operation.

Publication DE 10 2008 061 685 A1 discloses a loading station for transport pockets transported in a suspension conveyor installation, with an upper feed rail for the transport pockets, with a vertical conveyor adjoining the feed rail for feeding the transport pockets into a lower loading position, with a device for opening the transport pockets in the loading position and with a lower discharge rail adjoining the vertical conveyor for discharging the transport pockets out of the loading position.

Publication DE 10 2008 026 720 A1 describes a transport pocket with a carrying wall, which is provided in its upper region with a carrying coupling and a swivellable bracket, in its lower region with at least one coupling, in its upper region with means for opening the coupling and with means for closing the coupling, and with a bottom side wall flexible at least in the lower region, which is connected in its upper region to the swivellable bracket and is provided in its lower region with counter-coupling means to be received in the at least one coupling.

Publication DE 10 2011 101 987 A1 discloses a transport pocket for conveying conveyed goods in a conveyor installation, in particular a suspension conveyor installation, with a carrier part, which is designed to be received on a conveying line of the conveyor installation, with a loading means for receiving the conveyed goods, wherein the loading means comprises a closure flap, which comprises a handling strap with a clamping portion, wherein the carrier part comprises a clamping device with a clamping lever, which can be displaced between a holding position, in which a holding force acts on the clamping portion, and a release position, and wherein the clamping lever is coupled in the holding position with the clamping portion in such a way that the accommodated conveyed goods bring about an increase in the holding force by their weight.

Publication DE 10 2012 108 757 A1 relates to a carrying pocket for a suspension conveyor device for the suspended transport of objects, comprising a holding frame, a pocket hag, which hangs on the holding frame and in which objects to be transported can be accommodated, and a suspension element, which is connected to the holding frame and by means of which the carrying pocket can be suspended on the suspension conveyor device in order to be transported in a suspended manner by the suspension conveyor device. The pocket bag comprises a first and a second bag section, which each comprise a first bag end section connected to the holding frame and a second bag end section facing away from the holding frame, wherein the second bag end sections are connected together by a linkage mechanism, which can be brought into an unloading position in which the second bag end sections are arranged at a distance from one another, so that for the discharge of objects the pocket bag is provided with an outlet opening formed between the two bag end sections, and which can be brought into a loading position in which the second bag end sections are arranged adjacent to one another, so that the outlet opening is closed and the pocket bag can receive objects.

Publication DE 10 2013 205 172 A1 discloses a transport pocket for the suspended transport of goods. The transport pocket has a stiff carrying wall which, in its upper section in the transport position is connected to a carrying element for the suspended carrying of the transport pocket. A flexible goods retaining wall forms, together with the carrying wall, a carrying pocket closed at the bottom and at two opposite sides at least in the transport position of the transport pocket. The carrying wall is connected to the retaining wall between an upper—in the transport position—wall-connecting portion and a lower—in the transport position—wall-connecting portion, in such a way that the length of the web-like retaining the wall between the two wall-connecting portions are adapted variably to the transport of different goods. The embodiment of the transport pocket is such that this length adaptation of the retaining wall takes place by a relative displacement of the retaining wall with respect to the carrying wall at least in the region of one of the two connecting portions.

SUMMARY OF THE INVENTION

It is the object of the invention, therefore, to provide a transport device in the manner of a suspension conveyor, which can be used in a versatile and flexible manner, which equally permits straightforward manual operation, but also fully automatic conveying, and is characterised by a straightforward structure and greatly reduced susceptibility to malfunction.

The problem is solved by the subject invention. Advantageous embodiments of the device according to the invention are further described herein.

The transport device according to the invention, which is constituted in particular in the form of a suspension conveyor, comprises one or more carriages, which are movably mounted on a running rail in a running rail direction and on each of which a device for receiving transported goods is arranged hanging downwards.

The device for receiving transported goods forms at least one flexible material web that is planar when opened, said material web being able to be fastened at both ends to the carriage thereby forming a carrying loop or transport loop hanging downwards.

If a plurality of carriages is present, the latter can be moved individually, but also a plurality thereof can be interlinked and, in the extreme case, form a closed circulating chain.

In the closed state, the flexible material web forms a transport loop having a drop-shaped edge contour, which is open at both sides with no side walls, into which transport loop conveyed goods can be introduced and securely held there during the conveying process. In order to empty the transport loop, the latter is opened (at one side), so that the material web (in the unguided state) hangs down and releases the previously held conveyed goods.

The material web must on the one hand be sufficiently flexible in order to adapt to the conveyed goods. On the other hand, however, it must be sufficiently stable to form the drop-shaped contour and also to retain the latter at least approximately during the filling of the conveyed goods.

According to an embodiment of the invention, the at least one material web has a rectangular shape with a predetermined width and a predetermined length.

In particular, the at least one material web has a ratio of width (B) to length (L) greater than 0.1. The width can amount to several hundred mm.

If the device is to be used, for example, to convey items of clothing or similarly large transported goods, it is expedient for the material web to have a width of approx. 500 mm.

According to another embodiment of the invention, the at least one material web comprises a fabric, which in particular can be coated.

By means of a suitable coating, the fabric can optionally be made stiffer, smoother, duller, electrically conductive or insensitive to moisture, in order to adapt the properties of the material web to the goods to be conveyed. Depending on requirements, the fabric can be produced from natural or synthetic fibres. Thus, a fabric comprising high-strength fibres is recommended when heavy angular objects are to be transported. The type of fabric can also be adapted to the intended use.

It is however also conceivable for the at least one material web to comprise a film, which in particular can also be laminated and can comprise a plurality of layers joined together.

Furthermore, it is conceivable and also included in the term "material web" that the material web is constituted as a modular band chain or a mat chain, such as is known to the person skilled in the art from the field of conveyor technology.

According to a further embodiment of the invention, first and second devices for fastening the material web to one of the carriages are arranged at both ends of the at least one material web. These devices must be designed such that they can introduce the gravitational forces exerted by the transported goods on the material web into the carriage without being torn out or torn off. They must also stabilise the material web in its width in order that it does not fold together like a bag when under load.

In particular, the devices for fastening the material web to the carriage each comprise a transverse bar at each end of the material web. The transverse bars made of metal or plastic or wood take up the gravitational forces acting over the width of the material web and can introduce them in a concentrated manner into the carriage. A round or rounded cross-sectional contour of the transverse bars reliably prevents a notching effect and premature tearing of the fabric web.

The transition from the material web to the respective transverse bar proves to be particularly straightforward manner if the transverse bars fit into pockets provided for the purpose at the ends of the material web. These pockets can be formed in a straightforward manner in that an end portion of the material web is bent back with a curvature and is sewn to the web by a transverse seam at the bent-back end.

Particularly straightforward opening and closing of the transport loop is achieved by the fact that the first device for fastening the at least one material web to the carriage is fixedly connected to the carriage, and that the second device for fastening the at least one material web to the carriage is connected detachably to the carriage. When the second device is released from the carriage, the material web can basically hang down freely at the first device and thus enable easy unloading of the transport loop.

It has proved to be a stabilising factor if the first device for fastening the material web to the carriage is fixedly connected to the carriage by two fastening elements spaced apart from one another in the transverse direction.

Two parallel, vertical bars are in particular provided as fastening elements, which fixedly connect the first device to the carriage.

In contrast, the second device for fastening the material web to the carriage can be connected detachably to the carriage preferably by hooking. Hooking and unhooking can in principle be carried out manually. However, it can also readily be carried out fully automatically if suitable engagement means are present between the second device and a suitable opening and closing mechanism.

In particular, the hook-shaped carrying elements can be arranged on the carriage for hooking up the second device.

Alternatively, an eyelet-shaped carrying element can be arranged on the carriage for hooking up the second device, into which eyelet-shaped carrying element the second device can be hooked with a hook.

In order to provide the possibility of engagement with the second device, the transverse bar of the second device can project at both ends laterally beyond the material web and in each case comprise a fastening element there, by means of which the second device can be engaged with devices arranged laterally on the transport device.

The actuating elements can be identical at both ends of the transverse bar.

In particular, the actuating elements can be rotatable around the longitudinal axis of the transverse bar and be from the group of rollers, ball bearings and wheels.

The actuating elements can however also be mounted non-rotatably on the transverse bar and can be constituted hemispherical, spherical or cambered.

In order to enable swivelling around the longitudinal axis of the transverse bar during the engagement or to bridge a larger spacing, the actuating elements can also be constituted as roller levers.

A further embodiment of the invention is characterised in that the at least one material web is provided with an information carrier, which contains and/or can store information concerning the respective material web or the transport loop and/or the transported goods transported therein. As a result, it is possible to monitor the path of the transported goods or the transport loop even inside the transport device, to assemble specific sequences of goods along the transport route or to remove individual goods in a targeted manner from such a sequence or to insert them into such a sequence.

According to yet another embodiment, safety tapes are applied at the edges on the longitudinal sides of the at least one material web, which safety tapes are locally connected fixedly to the material web at a plurality of fastening points arranged with a spacing one behind the other in the longitudinal direction, in such a way that the portions of the safety tapes located between two adjacent fastening points bulge out when the material web is arched and form a securing means for the transported goods transported in the carrying loop against slipping out laterally from the transport loop. A securing means can thus be achieved in a particularly straightforward and effective manner, which is automatically formed during the formation of the transport loop by suspension of the material web and which assumes its initial form again when the material web is straight.

Another type of securing means, more precisely against unintentional unhooking of the material web, results if hook-shaped carrying elements are arranged on the carriage for hooking up the second device, into which hook-shaped carrying elements the second device can be hooked with a securing portion in a first rotational position and is secured against unhooking in a second rotational position. This is particularly the case when the opening of the hook is so narrow that a securing portion with a semicircular cross-sectional area can pass through the opening only in a specific rotational position, whereas in another rotational position it does not pass through the opening.

BRIEF DESCRIPTION OF SEVERAL VIEWS OF THE DRAWINGS

The invention is to be explained in greater detail below with the aid of examples of embodiment in connection with the drawing. In the figures:

FIG. 1 shows a side view of an embodiment of a transport device according to the invention;

FIG. 2 shows a view in the conveying direction of the embodiment shown in FIG. 1;

FIG. 3 shows a side view of an embodiment of a transport device according to the invention;

FIG. 4 shows a view in the conveying direction of the embodiment shown in FIG. 3;

FIG. 5 shows a side view of an embodiment of a transport device according to the invention;

FIG. 6 shows a view in the conveying direction of the embodiment shown in FIG. 5;

FIG. 7 shows a side view of an embodiment of a transport device according to the invention;

FIG. 8 shows a view in the conveying direction of the embodiment shown in FIG. 7;

FIG. 9 shows a side view of an embodiment of a transport device according to the invention;

FIG. 10 shows a view in the conveying direction of the embodiment shown in FIG. 9;

FIG. 11 shows a side view of an embodiment of a transport device according to the invention;

FIG. 12 shows a view in the conveying direction of the embodiment shown in FIG. 11;

FIG. 13 shows a side view of a further example of embodiment of a transport device according to the invention, which is characterised by a reduction in the carrying elements on the carriage;

FIG. 14 shows a view in the conveying direction of the embodiment shown in FIG. 13;

FIG. 16B shows a side view of a step in the unloading of the transport loop after FIG. 16A;

FIG. 16C shows a side view of another step in the unloading of the transport loop after FIG. 16B;

FIG. 17 shows a side view, a further example of embodiment of a transport device according to the invention, which is characterised by a change in the coupling of the transport loop to the carriage;

FIG. 18 shows a view in the conveying direction of the embodiment shown in FIG. 17;

FIGS. 19 shows a side view, a further example of embodiment of a transport device according to the invention, which comprises different lateral actuating elements;

FIG. 20 shows a view in the conveying direction of the embodiment shown in FIG. 19;

FIG. 21 shows a side view, a material web bent to form a transport loop, said material web having safety tapes for securing against slipping-out laterally;

FIG. 22 shows a view in the conveying direction of the embodiment shown in FIG. 21;

FIG. 23 shows a type of securing means against unintentional unhooking of the material web;

FIG. 24 shows a type of securing means against unintentional unhooking of the material web.

DETAILED DESCRIPTION OF THE INVENTION

Figure 16A:
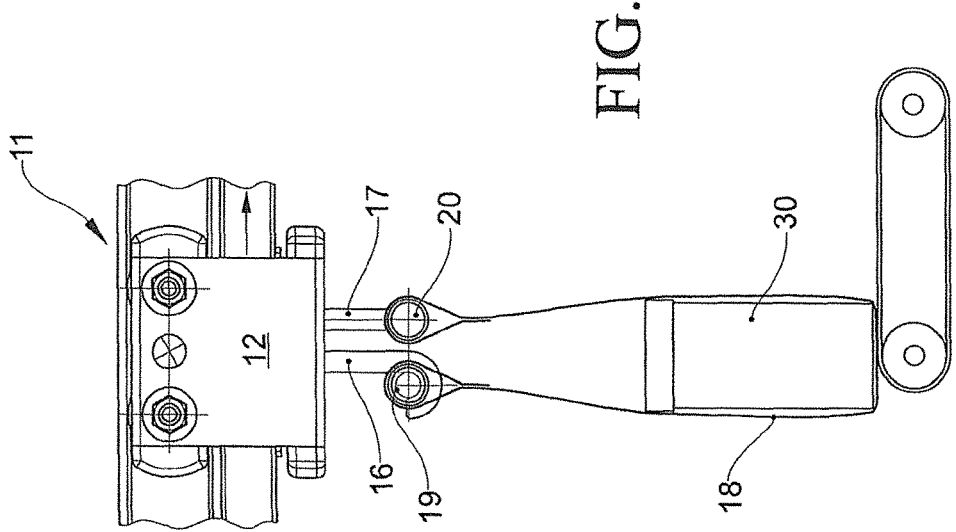
FIGS. 16A shows a side view of the material web fastened with two ends to the carriage and pulled together to form a transport loop filled with transport goods in the example of embodiment from FIG. 1.

FIGS. 1 and 2 each show, in a side view (FIG. 1) and in a view in the conveying direction (FIG. 2), an example of embodiment of a transport device according to the invention.

The transport device 10.1 of FIGS. 1 and 2 comprises a running rail 15, which extends in a conveying direction (arrow in FIG. 1) and runs horizontally in the example of FIG. 1 and which, in the example, is produced from the a repeatedly bent sheet metal strip symmetrical with respect to a vertical central plane and comprises two mutually opposite carrying rails and a guide rail with a rectangular profile constituted below in the middle. A carriage 11 is guided movably in the rail direction suspended on running rail 15. Carriage 11 has a U-shaped carriage body 12, which carries on both legs in each case a pair of carrying runner rollers 13a and 13c and in the lower region guiding runner rollers 13b, with which it engages in running rail 15 laterally and from beneath.

A laterally outwardly projecting driver 14a and 14b is fitted to carriage body 12 respectively between lateral runner roller pairs 13a and 13c, which driver can bring the carriage when required into engagement with a drive device, a braking device, a switching device or suchlike. A pair of fastening elements 17 or more precisely 17a, b spaced apart normal to the rail direction and a pair of carrying elements 16 or more precisely 16b arranged behind the latter in the running direction project vertically downwards from the lower base of U-shaped carriage body 12.

The two bar-shaped fastening elements 17 or more precisely 17a, b are connected fixedly at the lower end to a first transverse bar 20 extending horizontally and normal and symmetrical with respect to the rail direction. The two hook-shaped carrying elements 16 or more precisely 16a, b receive a second transverse bar 19 arranged parallel to first transverse bar 20, said second transverse bar being able, as it were, to be "inserted" into the two hooks 16a, b and removed again.

Figure 15:
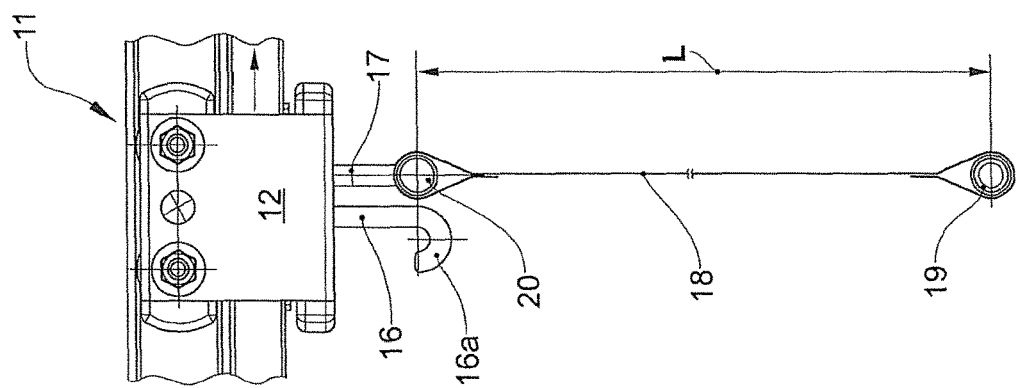
FIG. 15 shows a side view of the opened material web hanging freely on the carriage in the example of embodiment from FIG. 1.

Each of the two transverse bars 19 and 20 fits in an associated pocket of a rectangular material web 18 which has a predetermined width B (FIG. 1) and a predetermined length L (FIG. 15), said pocket being constituted at the end. In the unhooked state (FIG. 15), material web 18 hangs only via transverse bar 20 on carriage 11 and with free transverse bar 19 vertically downwards and thus has the form of a planar web. In the suspended state (FIG. 16), in which transverse bar 19 is hooked up into hook-shaped carrying elements 16 or more precisely 16a, b, material web 18 forms a laterally open carrying or transport loop, into which transported goods 30 to be conveyed can be placed. Material web 18 can be provided with an information carrier 29, which is glued on or sewn on or sewn in or otherwise fastened. In particular, information carrier 29 can be an RFID or a comparable, also optical, contactless readable element, which contains and/or can store information concerning the given material web 18 or transport loop and/or transported goods 30 transported therein.

In order that transverse bar 19 fitted in the pocket of material web 18 can be suspended in hook-shaped carrying elements 16 or more precisely 16a, b, corresponding cut-outs are provided in material web 18 in the suspension region, through which cut-outs direct access to transverse bar 19 located in the pocket is possible (see FIG. 2). Moreover, transverse bar 19 can comprise sections with reduced diameter in the region of the cut-outs, said sections with reduced diameter preventing displacement of suspended transverse bar 19 in the bar longitudinal direction. As an alternative, and for the same purpose, transverse bar 19, which in itself is thin, can comprise a thickened portion between the two carrying elements 16a, b.

Actuating elements 21a, b are arranged in each case at the two outer ends of suspended transverse bar 19, which actuating elements project laterally beyond width B of material web 18 and, in the example of embodiment of FIGS. 1 and 2, have the form of simple rollers rotatable around the central axis of transverse bar 19. By means of these roller-like actuating elements 21a, b, transverse bar 19 can roll on a guide link arranged on both sides of running rail 15 and be moved upwards by means of the link in order to unhook transverse bar 19 automatically and to achieve the opened state represented in FIG. 15. Accordingly, automatic hooking-up can also be brought about by means of actuating elements 21a, b (transition from FIG. 15 to FIG. 16).

Transverse bars 19 and 20 can be made of metal, plastic or wood. They can be constituted by solid material, but can also be tubular.

Material web 18 can be made of a fabric, which in particular can be coated. With a suitable coating, the fabric can optionally be made stiffer, smoother or duller, electrically conductive or insensitive to moisture, in order to adapt the properties of the material web to the goods to be conveyed. A stiffened fabric enables a better loop formation and exhibits more resistance to damage. A fabric smoother on the outer side allows adjacent, mutually contacting loops to slide off one another more easily. A duller fabric on the inner side, e.g. by a rubber coating, prevents slipping of the transported goods in the transport loop and damps down movements of the transported goods in the loop. An electrically conductive fabric prevents harmful electrostatic charges. A coating insensitive to moisture protects the material web against liquids running out of the transported goods.

Depending on the requirement, the fabric can be produced from natural or synthetic fibres. Thus, a fabric comprising high-strength fibres (e.g. Kevlar®) is recommended when heavy angular objects are to be transported. The type of fabric can also be adapted to the intended use. In particular, a fabric allows the possibility of constituting the pockets for transverse bars 19, 20 by a transverse seam.

It is however also conceivable for material web 18 to comprise one or more film(s), which can be laminated.

Material web 18 in the simplest case has a rectangular shape with a predetermined width B and a predetermined length L. Both magnitudes are governed by the size of the objects or goods to be conveyed. In particular, material web 18 can have a width of several hundred mm. If the transport device is to be used for example to convey items of clothing or similar broad conveyed goods, it is expedient for the material web to have a width of approx. 500 mm.

FIGS. 3 to 12 show, similar to FIGS. 1 and 2, in each case in a side view (FIGS. 3, 5, 7, 9 and 11) and a view in the conveying direction (FIGS. 2, 4, 6, 8, 10, 12), further examples of embodiment of a transport device according to the invention, which differ from the example of embodiment from FIGS. 1 and 2 only in the type of lateral actuating elements fitted to transverse bar 19.

In the example of embodiment of FIGS. 3 and 4 (transport device 10.2), ball bearings 22a, b are provided instead of rollers 21a, b, said ball bearings running particularly smoothly and for example further reducing the forces required for unhooking transverse bar 19.

In the example of embodiment of FIGS. 5 and 6 (transport device 10.3), tyred wheels 23a, b are provided instead of rollers 21a, b, said tyred wheels enabling smooth and in particular quieter running on the guide link.

In the example of embodiment of FIGS. 7 and 8 (transport device 10.4), hemispherical actuating elements 24a, b screwed fixedly to transverse bar 19 are provided instead of rollers 21a, b, said hemispherical actuating elements being less susceptible to malfunction and enabling a sliding engagement.

Similar advantages are achieved with fixedly screwed spherical actuating elements 25a, b in the example of embodiment of FIGS. 9 and 10 (transport device 10.5) and with fixedly screwed cambered actuating elements 26a, b in the example of embodiment of FIGS. 11 and 12 (transport device 10.6).

The invention is not restricted to transverse bars 19 and 20 of the same length, but also allows the transverse bars to have different lengths.

The example of embodiment of FIGS. 13 and 14 (transport device 10.7) differs from the example of embodiment of FIGS. 1 and 2 (transport device 10.1) in that hook-shaped carrying elements 16 or more precisely 16a, b fitted to carriage body 12 are completely dispensed with and instead hooks 27a, b are fastened to the ends of transverse bar 20 to receive transverse bar 19.

In the example of embodiment of FIGS. 17 and 18 (transport device 10.8), an eyelet-shaped carrying element 16' is fitted on carriage body 12 for the suspension of transverse bar 19, into which eyelet-shaped carrying element transverse bar 19 can be hooked with a hook 31 fitted centrally thereon.

Finally, the example of embodiment of FIGS. 19 and 20 (transport device 10.9) shows, as actuating elements, roller levers 28a, b with ball bearings fitted at the ends of transverse bar 19, with which the engagement possibilities with transverse bar 19 can additionally be extended.

In principle, the transport or carrying loop according to FIG. 16A formed from material web 18 is open at the sides and thus differs from a pocket that is also closed at the sides. However, straightforward and effective means can be provided in order to prevent transported goods 30 from slipping out laterally or at least to make this difficult. Suitable means for this purpose are represented in the example of embodiment of a transport loop in FIGS. 21 and 22. For this purpose, safety tapes 35a, b similar to curtain tapes are fixed at the edges to the longitudinal sides of material web 18. These safety tapes 35a, b are fixedly connected to material web 18, for example by sewing, gluing or clamps, at a plurality of fastening points 39 arranged with a (e.g. identical) spacing one behind the other in the longitudinal direction, whilst the portions of safety tapes 35a, b located between two adjacent fastening points 39 are not connected to material web 18 (FIG. 22).

The effect of this is that when material web 18 is arched, the portions of safety tapes 35a, b fitted on the inner side and located between adjacent fastening points 39 bulge out or stand up and securing means for transported goods 30 transported in the carrying loop against laterally slipping out of the transport loop are formed (FIG. 21). Safety tapes 35a, b can of course be arranged on both sides of material web 18, when both sides of material web 18 can each form the inner side of the transport loop, i.e. the material web can be used on both sides.

Another type of securing means emerges according to FIGS. 23 and 24 whereby hook-shaped carrying elements 16 with hooks having a particularly narrow opening are arranged on carriage 11 for hooking up the second device or transverse bar 19. The counterpart to this narrow hook opening is a securing portion inside device 19 with a, for example, hemispherical cross-section (cross-sectional drawing A-A in FIG. 24 top right), which is dimensioned such that second device 19 can be hooked up with the securing portion in a first rotational position (represented with an unbroken line in FIG. 23) and is secured against unhooking by a form-fit connection in a second rotational position brought about by swivelling lever 37 of actuating elements 28a, b through 90° (represented in FIG. 23 by a dashed line).

The loading and unloading of the transport loop formed by means of material web 18 by suspension or hooking-up can take place manually or automatically. FIGS. 16B and C show steps in the mechanical unloading of a transport loop. For this purpose, the closed loop with transported goods 30 according to FIG. 16A first sits on a pivoting belt conveyor 32, which is located in a horizontal position. Since transported goods 30 are thus supported by the belt conveyor, the transport loop can be unhooked at one side and be hooked at the side with transverse bar 19 in a hooking device 34 on another horizontal belt conveyor 33 (FIG. 16B).

By pivoting belt conveyor 32 out of the horizontal position into an inclined position (FIG. 16C), transported goods 30 can then slide on material web 18 onto the other belt conveyor 33 located lower down, on which they are transported away. Other types and procedures for loading and unloading are of course also conceivable.

Figure 25:
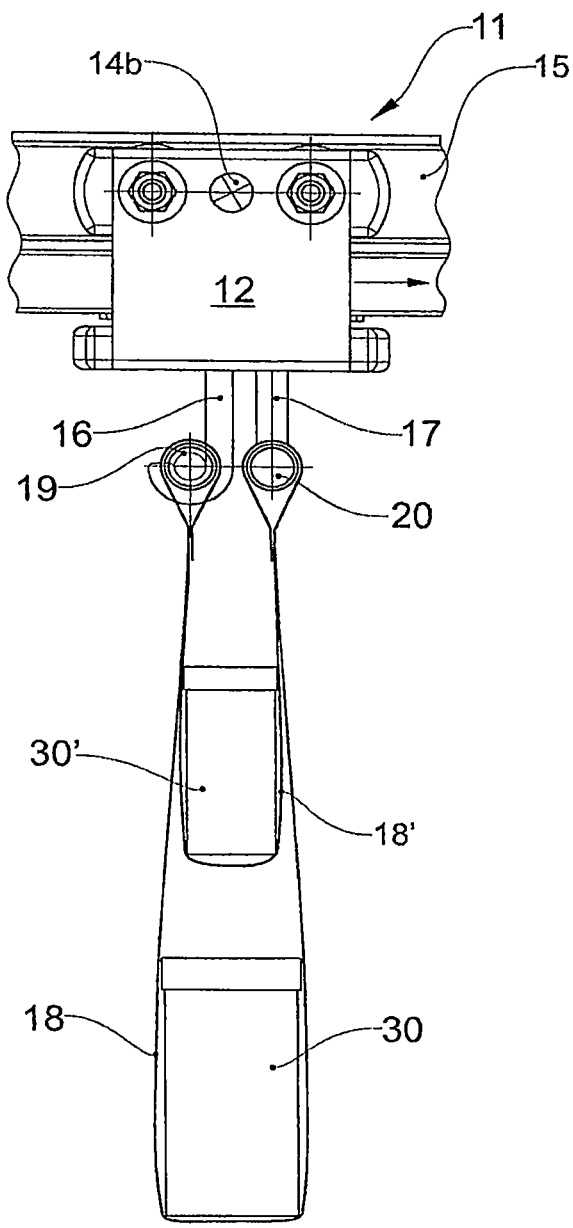
FIG. 25 shows a further example of embodiment of a transport device according to the invention with more than one material web (in the example two), so that a plurality of transported goods can be transported separately from one another.

Finally, it is readily conceivable within the scope of the invention to combine a plurality of material webs 18, 18' with one another instead of only one material web 18 according to FIG. 25, and more precisely either one above the other, as shown in FIG. 25, or also beside one another. A plurality of transported goods 30, 30' can thus be transported separately from one another. The loading and unloading then has to be adapted accordingly.

All the shown examples of embodiment have the advantage arising from the invention that, with the at least one hookable and unhookable material web 18, a particularly simply constructed and easily operated and also extremely robust and functionally reliable conveyor installation can be produced.

The invention claimed is:

1. A transport device (10.1-10.10), in the form of a suspension conveyor, comprising:
   one or more carriages (11) movably mounted on a mirroring rail (15) in a running rail direction;
   a device (18, 19, 20) for receiving transported goods (30, 30') is arranged hanging downwards on each of the one or more carriages (11), wherein the device (18, 19, 20) for receiving transported goods (30) forms at least one flexible material web (18, 18') that is planar when opened, said material web fastened at opposing ends (19, 20) to the carriage (11) thereby forming a carrying loop or transport loop hanging downwards;
   wherein first and second devices (19, 20) for fastening the material web (18, 18') to one of the carriages (11) are each arranged at one of the opposing ends of the at least one material web (18, 18'); and
   wherein the first device (20) for fastening the at least one material web (18, 18') to the carriage (11) is fixedly connected to the carriage (11), and that the second device (19) for fastening the at least one material web (18) to the carriage (11) is connected detachably to the carriage (11).

2. The transport device according to claim 1, wherein the at least one material web (18, 18') has a rectangular shape with a predetermined width (B) and a predetermined length (L).

3. The transport device according to claim 2, wherein the at least one material web (18, 18') has a ratio of width (B) to length (L) greater than 0.1.

4. The transport device according to claim 1, wherein the at least one material web (18, 18') comprises a coated fabric.

5. The transport device according to claim 1, wherein the at least one material web (18. 18') comprises a laminated film.

6. The transport device according to claim 1, wherein the devices (19, 20) for fastening the material web (18, 1 8') to the carriage each comprise a transverse bar (19, 20) at each end of the material web (18, 18').

7. The transport device according to claim 6, wherein the transverse bars (19, 20) fit in pockets provided at the ends of the material web (18, 18').

8. The transport device according to claim 1, wherein the first device (20) for fastening the material web (18, 18') to the carriage (11) is fixedly connected by two fastening elements (17; 17a,b) to the carriage (11).

9. The transport device according to claim 8, wherein two parallel, vertical bars are provided as fastening elements (17; 17a, b), which fixedly connect the first device 20) to the carriage (11).

10. The transport device according to claim 1, wherein the second device (19) for fastening the material web (18, 18') to the carriage (11) is connected detachably to the carriage (11) by hooking.

11. The transport device according to claim 10, wherein hook-shaped carrying elements (16; 16a,b; 27a,b) are arranged on the carriage (11) for hooking up the second device (19).

12. The transport device according to claim 10, wherein an eyelet-shaped carrying element (16') is arranged on the carriage (11) for hooking up the second device (19), into which eyelet-shaped carrying element the second device (19) is hooked with a hook (31).

13. The transport device according to claim 6, Wherein the transverse bar (19) of the second device projects at both opposing ends laterally beyond the material web (18) and comprises a fastening element (21a,b to 26a,b) there, whereby the second device (19) is engaged with devices arranged laterally on the transport device (10.1-10.10).

14. The transport device according to claim 13, wherein the actuating elements (21a,b to 26a,b; 28a,b) are identical at both opposing ends of the transverse bar (19).

15. The transport device according to claim 13, wherein the actuating elements (21a,b to 26a,b; 28a,b) are rotatable around the longitudinal axis of the transverse bar (19) and are selected from the group of rollers (21a,b), ball bearings (22a,b) and wheels (23a,b).

16. The transport device according to claim 13, wherein the actuating elements (21a,b to 26a,b; 28a,b) are mounted non-rotatably on the transverse bar (19) and are one of hemispherical (24a,b), spherical (25a,b) or cambered (26a, b).

17. The transport device according to claim 13, wherein the actuating elements (21a,b to 26a,b; 28a,b) comprise roller levers (28a,b).

18. The transport device according to claim 1, wherein the at least one material web (18, 18') is provided with an information carrier (29), which contains and/or can store information concerning the respective material web (18, 18') or the transport loop and/or the transported goods (30) transported therein.

19. The transport device according to claim 1, further comprising safety tapes (35a,b) applied at edges on longitudinal sides of the at least one material web (18, 18'), which safety tapes are locally connected fixedly to the material web (18, 18') at a plurality of fastening points (39) arranged with a spacing one behind an other in a longitudinal direction, in such a way that portions of the safety tapes (35a,b) located between two adjacent fastening points (39) bulge out or stand up when the material web (18, 18') is arched and form a securing means for the transported goods (30) transported in the carrying loop against slipping out laterally from the transport loop.

20. The transport device according to claim 10, wherein hook-shaped carrying elements (16) are arranged on the carriage (11) for hooking up the second device (19), into which hook-shaped carrying elements the second device (19) are hooked with a securing portion (38) in a first rotational position and secured against unhooking in a second rotational position.

21. The transport device according to claim 20, wherein the securing portion includes a semicircular cross-sectional area.

\* \* \* \* \*